US 7,984,835 B2

(12) United States Patent
Fontaine et al.

(10) Patent No.: US 7,984,835 B2
(45) Date of Patent: Jul. 26, 2011

(54) POWDER DOSING DEVICE

(75) Inventors: Ivan-William Fontaine, Nogent-sur-Marne (FR); Patrick Herbelin, Pommeuse (FR)

(73) Assignee: Mettler-Toledo AG, Greifensee (CH)

( * ) Notice: Subject to any disclaimer, the term of this patent is extended or adjusted under 35 U.S.C. 154(b) by 1659 days.

(21) Appl. No.: 10/476,700

(22) PCT Filed: Apr. 29, 2002

(86) PCT No.: PCT/FR02/01484
§ 371 (c)(1),
(2), (4) Date: Dec. 12, 2003

(87) PCT Pub. No.: WO02/090896
PCT Pub. Date: Nov. 14, 2002

(65) Prior Publication Data
US 2004/0155069 A1  Aug. 12, 2004

(30) Foreign Application Priority Data

May 7, 2001  (FR) ...................................... 01 06090

(51) Int. Cl.
*G01F 11/20* (2006.01)
(52) U.S. Cl. ......................................... 222/412; 222/196
(58) Field of Classification Search ................ 222/412, 222/413, 496, 390, 196–199, 575, 181.1
See application file for complete search history.

(56) References Cited

U.S. PATENT DOCUMENTS

| 2,593,803 | A |   | 4/1952  | Schofield |           |
|-----------|---|---|---------|-----------|-----------|
| 3,255,937 | A | * | 6/1966  | Jarrett   | 222/480   |
| 3,913,798 | A | * | 10/1975 | Allen     | 222/281   |
| 3,951,309 | A | * | 4/1976  | Kadowaki  | 222/64    |
| 4,305,529 | A | * | 12/1981 | Spehrley, Jr. | 222/228 |
| 5,333,762 | A | * | 8/1994  | Andrews   | 222/238   |
| 5,383,578 | A | * | 1/1995  | Nishimura | 222/108   |
| 5,713,494 | A | * | 2/1998  | Kaiju et al. | 222/199 |
| 5,823,387 | A | * | 10/1998 | Manadanas et al. | 222/1 |
| 6,136,257 | A | * | 10/2000 | Graf et al. | 264/460 |
| 6,182,655 | B1|   | 2/2001  | Keller et al. |       |
| 6,253,959 | B1| * | 7/2001  | Gaultney et al. | 222/55 |
| 6,679,402 | B1| * | 1/2004  | D'Alayer De Costemore D'Arc | 222/413 |

FOREIGN PATENT DOCUMENTS

| DE | 35 20 240 C |   | 6/1986 |         |
|----|-------------|---|--------|---------|
| DE | 89 14 389 U |   | 1/1990 |         |
| FR | 2672035     | * | 1/1991 | 222/412 |
| FR | 2 672 035 A |   | 7/1992 |         |
| FR | 2775985     | * | 3/1998 |         |
| FR | 2 775 958 A |   | 9/1999 |         |
| SU | 1799531     | * | 7/1990 |         |

OTHER PUBLICATIONS

Abstract of Japanese Publication No. 63-001633, published on Jan. 6, 1988, 1 page.

* cited by examiner

*Primary Examiner* — Lien T Ngo
(74) *Attorney, Agent, or Firm* — McCracken & Frank LLP

(57) ABSTRACT

A power measure-dispensing cap including a body having a first end face, which is designed to be brought into contact with a powder container, and a second end face which, together with the first end face, defines at least one feed opening which flares out towards the first end face, the feed opening supplying at least one endless screw; and at least one opening. The opening is disposed in the second end face in contact with the endless screw.

20 Claims, 9 Drawing Sheets

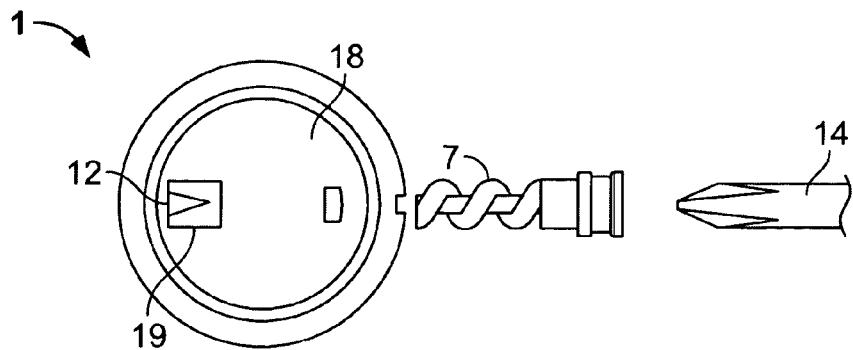
FIG. 9A
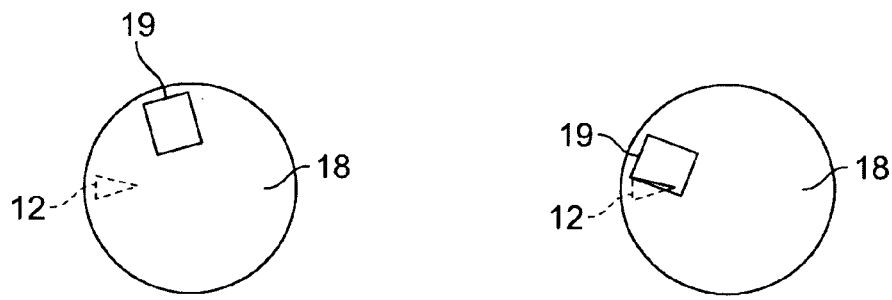
FIG. 9B   FIG. 9C
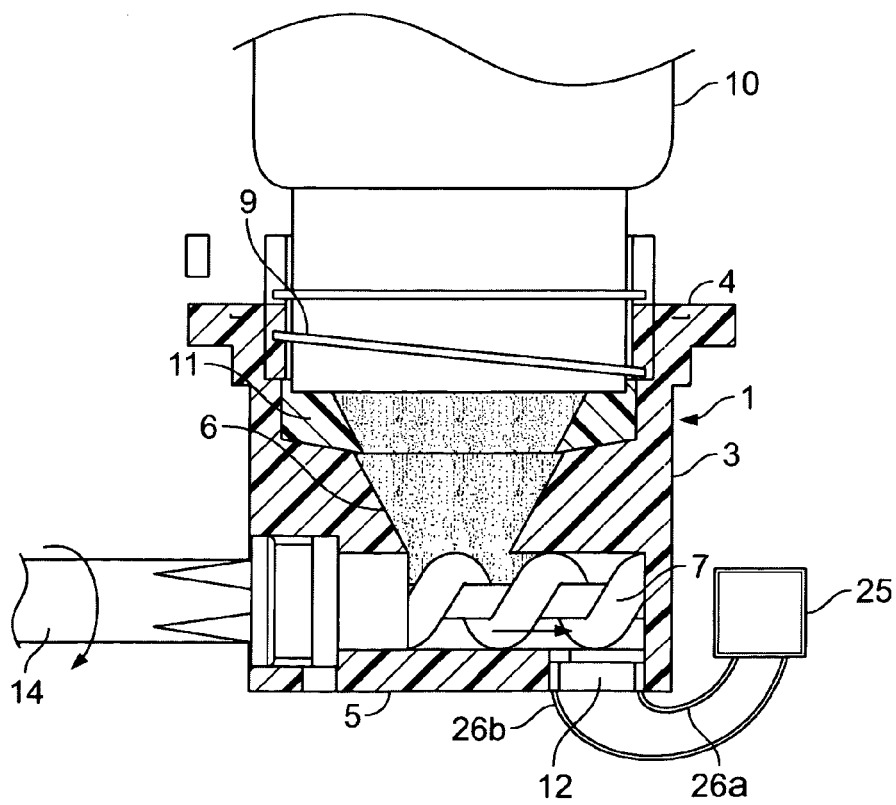
FIG. 10

POWDER DOSING DEVICE

The present invention relates to a powder dosing device.

More particularly, the present invention relates to a dosing device comprising a powder container and a dosing cap allowing small masses of powders to be dispensed with great precision.

In the chemical and pharmaceutical industry, it is often necessary to perform precise weighing operations on reagents or products in powder form, in particular from collections of chemical compounds. When conducting tests on a large number of powdered products, the successive weighing operations become particularly tedious. They may pose a risk of contamination to the operating personnel or may cause degradation of the product.

It has therefore been sought to automate these weighing operations in order to permit the dispensing of defined masses of a large variety of powders, with the desired precision. Another objective has been to safeguard the operating personnel from possible contamination while at the same time protecting the product from possible degradation.

Patent application FR 2 672 035 describes a device which allows defined masses of powders to be dispensed. This device is made up of a flask of powder and a dosing cap. The dosing cap comprises a cylindrical conical body having a first end face communicating with the flask, and a second end face which defines, together with the first end face, a conical feed hopper which widens toward the first end face.

The feed hopper supplies an endless screw. The body of the cap comprises an opening positioned on the side of the body of the cap, in the axis of and at the end of the endless screw. When the flask is turned upside down, the powder fills the feed hopper. By rotating the endless screw, it is possible to dispense controlled quantities of powder through the opening.

The device is entirely adequate for dispensing masses of products ranging from about 5 mg to about 8 mg and above, with a precision of the order of 1 mg.

Another device of the same type is described in patent application FR 2 775 958. The principle of using a cap provided with an endless screw and with a dispensing opening at the end of the endless screw is also already evoked in a document as old as U.S. Pat. No. 2,593,803.

German utility model No. 89 14 389 U in the name of Fink-Chemie GmbH describes a device for dosing of flowing materials, in particular powders. This device is equipped with an inlet supplying powder to an endless screw. This endless screw conveys the powder toward a dispensing opening formed in the lower surface of the device.

This device however is not like a dosing cap for precision dosing of small quantities of powders of various types, as is demanded in particular when working with a collection of chemical compounds. On the contrary, this device appears to be designed for dosing large masses of powders where precision is of less importance. Nor does this utility model mention any dosing precision requirements.

The requirements of the chemical and pharmaceutical industry now demand weighings of 1 to 2 mg with precisions which can be of the order of 0.1 to 0.2 mg, i.e. far beyond the performance capabilities of powder dispensers of the prior art.

The Applicant has discovered surprisingly and has developed a novel powder dosing device with which it is possible to satisfy the new requirements imposed by the chemical and pharmaceutical industry for weighing of products.

Such a dosing device is particularly suitable for aliquoting from a collection of chemical compounds or for fractionation from storage flasks. It will be able to be used with powders or small solids of very different grain sizes and different appearances, for example talc, lactose, cornstarch, or sand. In this patent application, the term "powder" designates powders or small solids, such as those mentioned by way of example above, with a grain size smaller than the thread and the radius of the endless screw.

The present patent application therefore relates to a dosing cap, comprising a body having a first end face designed to be brought into communication with a powder container, a second end face which, together with the first end face, defines at least one feed hopper which widens toward the first end face, the feed hopper supplying at least one endless screw, and at least one opening. The cap according to the invention is characterized in that the opening is positioned on the second end face, in communication with the endless screw.

The present patent application also relates to a dosing device comprising a cap according to the invention and a powder container.

Without being bound by any theory, the Applicant has found that by placing the dispensing opening in the second end face of the body of the cap, rather than in the side of the body of the cap, in the axis of and at the end of the endless screw, the flow is better governed and a much finer degree of control is achieved. This makes it possible to dose much smaller quantities of powders, and to do so with a high level of precision.

More specifically, the device comprising the cap according to the invention makes it possible to dose powder masses of significantly less than 5 mg, particularly of less than 3 mg, even of about 1 to 2 mg. The weighing precision can be below 1 mg, preferably below 0.5 mg, more preferably of the order of 0.1 to 0.2 mg, for most of the weighing operations (the nonstandard weighing operations are those in which the desired precision has not been achieved). Most of the weighing operations is defined as being more than 50% of the weighing operations performed, preferably at least 75%, more preferably at least 85%, of the weighing operations. The maximum figure of 100% of the weighing operations may even be achieved in some cases.

In addition to the possibility of weighing smaller masses, with improved precision, the device according to the invention, provided with the dosing cap according to the invention, also saves a great deal of time and permits better preservation of the powders to be sampled by limiting their manipulation.

The device according to the invention can be coupled to an automatic system, which is run by software, in order to facilitate its control and to fully automate the weighing operations.

During the dispensing, it is particularly advisable to tap on or to vibrate the device in order to loosen the powder if necessary or to eliminate the stacking effects arising in the dosing cap or the container. This improves the supply to the endless screw via the feed hopper. The powder can also be dispensed by vibrating or tapping on the device whether or not the screw is rotating. The act of vibrating or tapping on the device in fact allows the powder to advance along the thread of the endless screw and as far as the opening. The device according to the invention will thus advantageously comprise a device promoting the dispensing of the powder, in particular by tapping, for example by means of a movable and retractable finger which can strike the dosing cap, or the container communicating with the latter, for example 4 times per second, and/or by vibration, in particular by means of a holding fork of the device.

The device according to the invention can also be provided with an agitator placed in the feed aperture. This agitator will have principally two functions by which the dosing can be adjusted.

The first function of the agitator is that of eliminating the stacking effects in the feed aperture as these are detrimental to efficient dispensing of the powder.

The second function of the agitator is that of supplying or even filling the endless screw.

This agitator can advantageously be a rotary element rotating about an axis substantially perpendicular to the first and/or second end face. A substantially perpendicular axis is understood as being an axis intersecting the first and/or second end face at an angle of 90°±45°.

The agitator can be driven by means of a motor which may or may not be connected to a computer controlling its rotation depending on the dosing requirements. In the preferred embodiments, the agitator is selected from the group consisting of an endless screw, a drill, or a rod equipped with vanes.

When the powder dosing device is not in use, the cap can be completely or partially covered by a hood which closes the opening off and thus prevents contamination by dust or ambient air.

The powder container can be of any size or shape and can be constructed of any material which is thermally stable under the conditions of storage and use and is chemically inert to the powders which it contains. The container may in particular be any pill box or flask commonly used in collections of chemical compounds. By way of example, mention may be made of the glass pill boxes, for example with neck, of the BV18 Pharma type. The skilled person will be easily able to adapt the dimensions of the dosing cap to the container used or provide an intermediate part for adapting a given cap to a given container. Thus, the dosing cap according to the invention will be able to be adapted to any pill box in the user's possession.

The cap according to the invention can be provided with a means ensuring leaktightness between the cap and the container during use. Such a means can be a lip, for example a washer.

The first end face of the body of the cap is open completely or partially in order to permit communication between, on the one hand, the container containing the powder to be dispensed, and, on the other hand, the feed hopper.

The first end face can be fixed to the container containing the powder by any known means, for example by means of a screw thread, by clipping together, adhesive bonding, molding, preferably by means of a screw thread.

The body of the cap can have an indicator on its outer surface in order to permit positioning of the cap when it is used in an automatic system.

The endless screw preferably extends through the dosing cap on an axis forming an angle substantially equal to 90°±45° relative to the vertical central axis intersecting the first and second end faces of the cap. This angle is more preferably equal to 90°.

The diameter and the pitch of the endless screw can be modified depending on the type of powder to be dispensed. The endless screw preferably has a diameter close to its pitch. It can transport the powder in one direction or the other, depending on the direction of rotation applied to the screw. The direction of dispensing of the screw is defined as being that permitting the transport of the desired product toward the dispensing opening.

The endless screw can also comprise a transmission member designed to permit its rotation. This transmission member can for example be a recess at one end of the endless screw and on its axis. This recess is preferably cross-shaped. If the product is dispensed exclusively by vibration or tapping, the transmission member may be absent.

The device can be coupled, if appropriate by way of the transmission member of the endless screw, to a device by which it is possible to control and vary the angle of increment of rotation or the speed of rotation of the endless screw by action of a rotary movement on the transmission member or the force or frequency of vibration or tapping. Under these conditions, the movement of the endless screw and/or the vibration or tapping of the device are subject to the weighing indications of the balance via an external signal, and they are stopped when the desired powder mass is achieved.

The device according to the invention can also be coupled to one or more antistatic devices, generating an electrical field promoting the dispensing of the powder. Without being bound by any particular theory, the Applicant believes that the powders to be dosed are naturally charged or that the friction exerted by the grains of the product to be dispensed on the elements of the device generates charged entities. The charges induce forces leading in particular to agglomeration of the grains or to magnetization of the grains in contact with the elements of the device. The device according to the invention is thus preferably equipped with at least one antistatic device placed on the cap at the outlet of the dispensing opening and generating an electrical field making it possible to channel the movement of the particles. In order to cover the whole of the dispensing opening, two antistatic devices will preferably be used. An antistatic device can be a pointed ionizing probe generating an electrical field of 4 kV, for example.

The dosing cap can be of any size or shape. It can in particular have the shape of a cone, of circular or noncircular cross section, delimited by a wall, a first end face, and a second end face. These end faces may or may not be perpendicular to the axis of the cone. Likewise, the cap can be made of any material thermally stable under the conditions of use and storage and chemically inert to the powders to be dosed. This material can in particular be a polymer material such as polyethylene, polypropylene, fluoropolymers, for example polytetrafluoroethylene (teflon©). Each part can be molded. In a preferred embodiment, the body of the cap is made of a material different than that of the screw in order to limit the wear caused by friction of two identical materials.

The opening positioned on the second end face of the dosing cap can be of any shape, in particular in the shape of a triangle, quadrilateral, circle, ellipse, or any other shape.

In a preferred embodiment of the cap and of the device according to the invention, the opening is in the shape of a triangle centered on the axis of the endless screw and having an angle opening in the direction of dispensing of the screw. The triangle shape permits dispensing of a wide range of powders of widely varying grain sizes. By way of an indicative and nonlimiting example, the powders generally dosed by means of this appliance are made up of particles with a diameter of less than or equal to 100 μm.

In another preferred embodiment, the opening is a triangle centered on the axis of the endless screw and having an angle opening in the direction of dispensing of the screw, and formed within a thickness less than the full thickness of the second end face, toward the inside of the cap.

According to a particular embodiment of the invention, the dosing cap (1) comprises a means of closing off all or part of the opening (12), thus making it possible to modify the surface area of the opening before, during or after operation of the dosing cap.

This closure means can for example comprise at least one element covering all or part of the second end face (5). This closure means is mounted so as to be movable relative to the second end face, either in a pivoting movement or in translation. The closure means comprises a through-hole which can be positioned opposite the opening (12). Possible examples of such closure means are a diaphragm shutter of the camera type or a slide shutter of the types known to the skilled person.

The powder dosing dispenser according to the invention works in the following way:
- the container containing the powder to be dispensed and equipped with the dosing cap is placed vertically, the second end face and the dispensing opening being directed downward,
- the endless screw is supplied with powder through the feed hopper and is set in rotation about its longitudinal axis, by any suitable system, in a direction of rotation permitting the dispensing of the powder through the opening. Alternately, the dispensing is obtained by vibration or tapping of the device. The container receiving the powder can be placed on the pan of a balance in order to continuously monitor the dispensing,
- once the desired mass of powder has been dispensed, the rotation of the endless screw and/or the vibration or tapping are stopped,
- the device is ready for a new operation: it can be stored away, or it can be used to dispense a further, identical or different dose.

When a dosing operation has been concluded, the endless screw is preferably set in rotation in the direction counter to that inducing the dispensing, so that the powder situated near the end of the endless screw is returned to the feed hopper. Simultaneously, the dosing device is turned upside down while the rotation of the endless screw is maintained. The dosing cap is, if appropriate, held in place by the hood provided for this purpose. The result of this procedure is that the powder remaining in the endless screw is reintroduced via the feed hopper into the container containing the powder and is isolated from contamination.

If the dosing dispenser comprises at least one antistatic device, said antistatic device can remain functioning permanently for the duration of use of the dosing dispenser (for example 100 successive dosing operations).

The invention will now be described in more detail with reference to the figures.

FIGS. 9a, 9b, and 9c is an end view showing another embodiment in the open, closed, and partly closed positions, respectively.

FIG. 10 is a schematic side view in cross-section of yet another embodiment.

Figure 11:
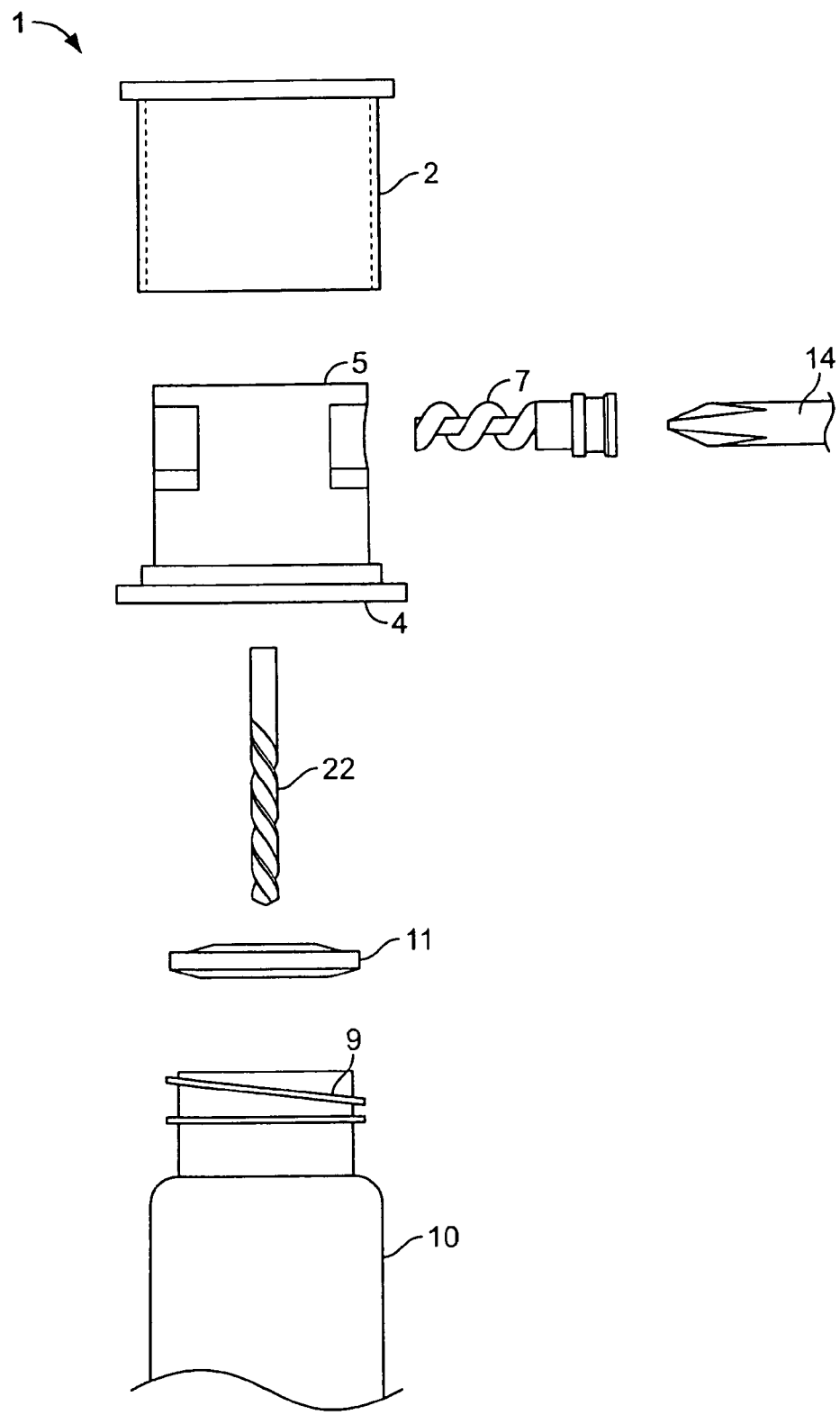

FIG. 11 is an exploded side view of a further embodiment.

Figure 1:
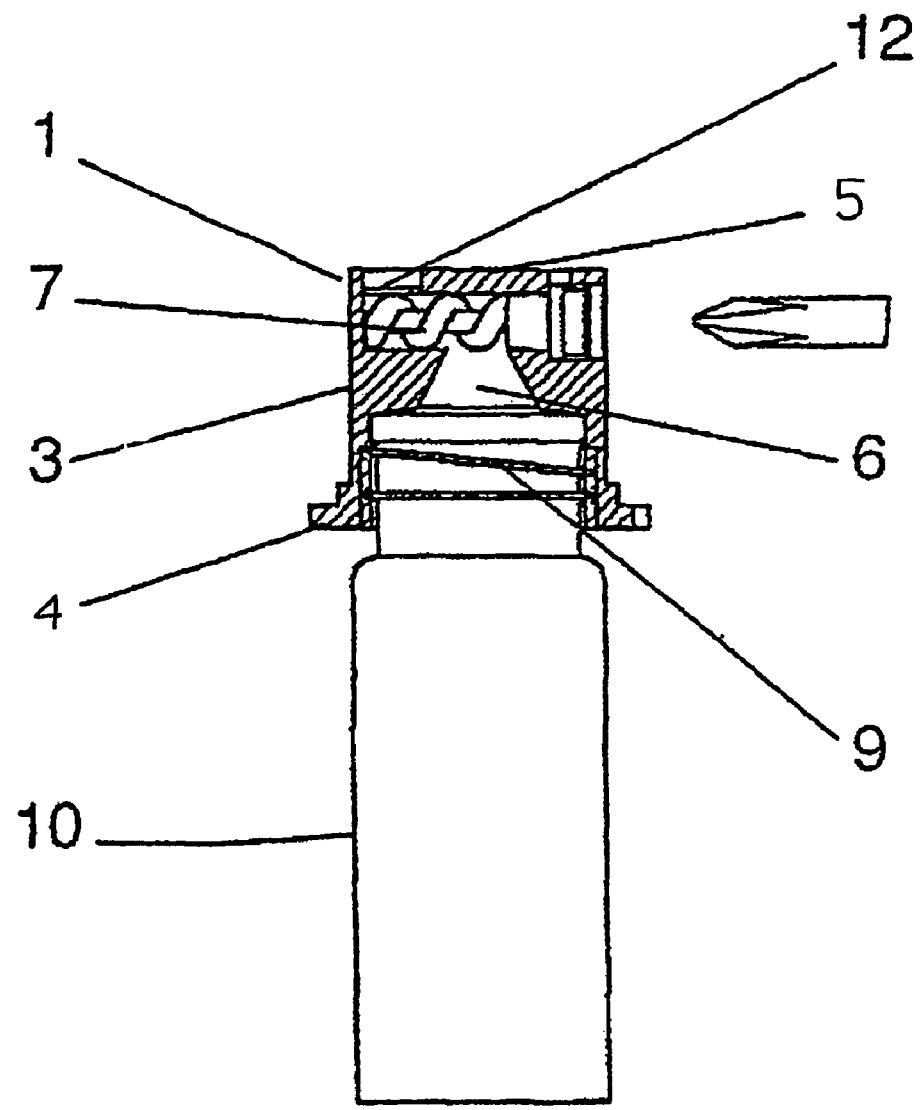
FIG. 1 is a side view, in cross section, of an embodiment of the dosing device according to the invention.

FIG. 1 shows an embodiment of a dosing device when it is not in operation. In this particular embodiment, the cap (1) is a cylinder. The body (3) has a first end face (4) and a second end face (5) delimiting, together with the first end face, a conical feed hopper (6) widened toward the first end face. The feed hopper (6) supplies the endless screw (7) whose axis is shown in the plane of the paper. The endless screw communicates with an opening (12). The first end face (4) is equipped with a thread (9) and is screwed onto a powder container (10).

Figure 2:
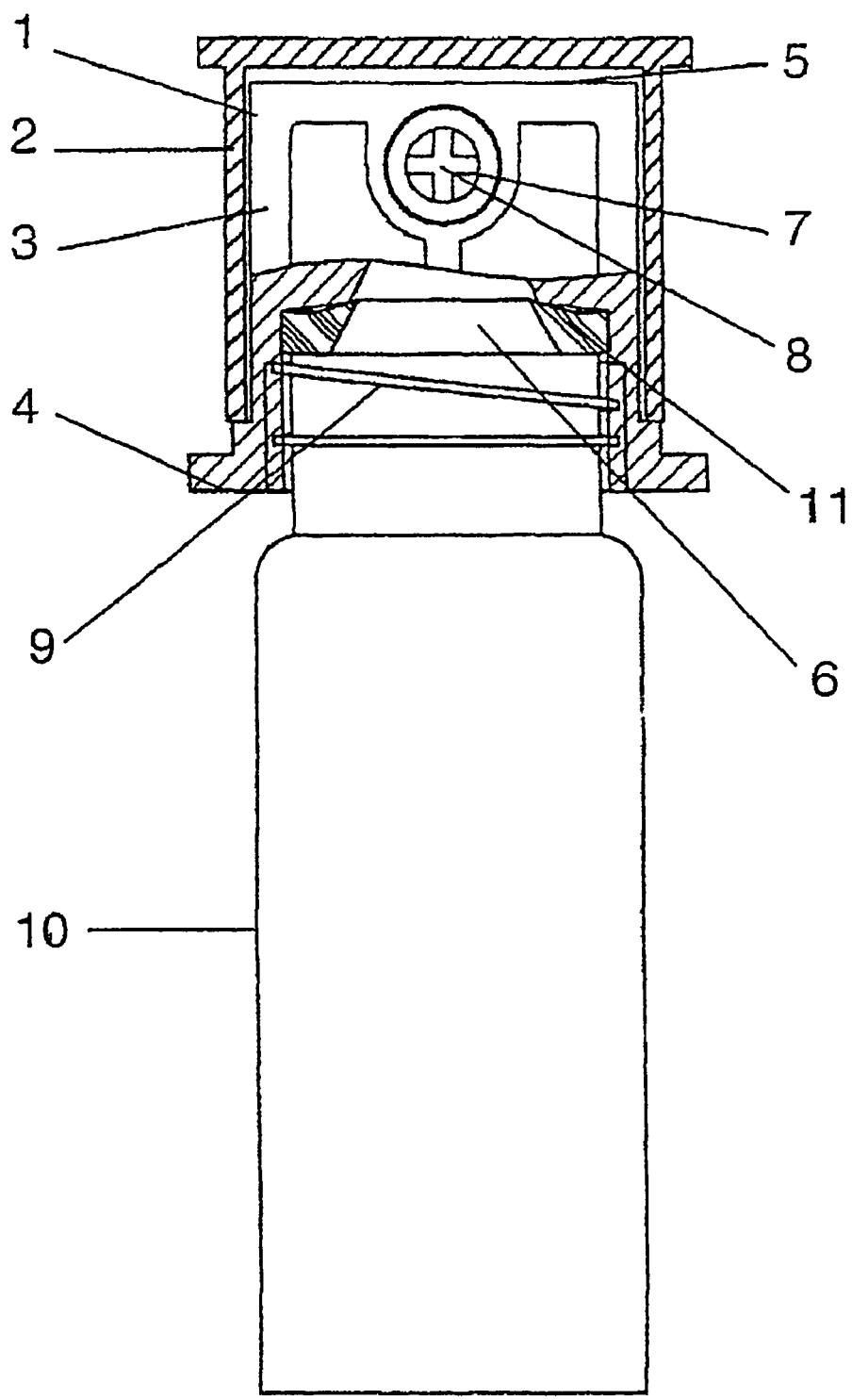
FIG. 2 is a side view, in cross section, and at a different angle, of the embodiment of the dosing device according to FIG. 1.

FIG. 2 shows the dosing device from FIG. 1 at a different angle. The reference numbers have the same meanings. The endless screw (7) is shown in an axis perpendicular to the paper and is equipped with a cross-shaped transmission member (8) designed to permit its rotation. A washer (11) ensures leaktightness when the cap is fixed on the container (10). The dosing cap is equipped with a hood (2) which is a cylinder designed to cover the body (3) and prevent contamination of the powder or of the equipment by dust or ambient air.

Figure 3:
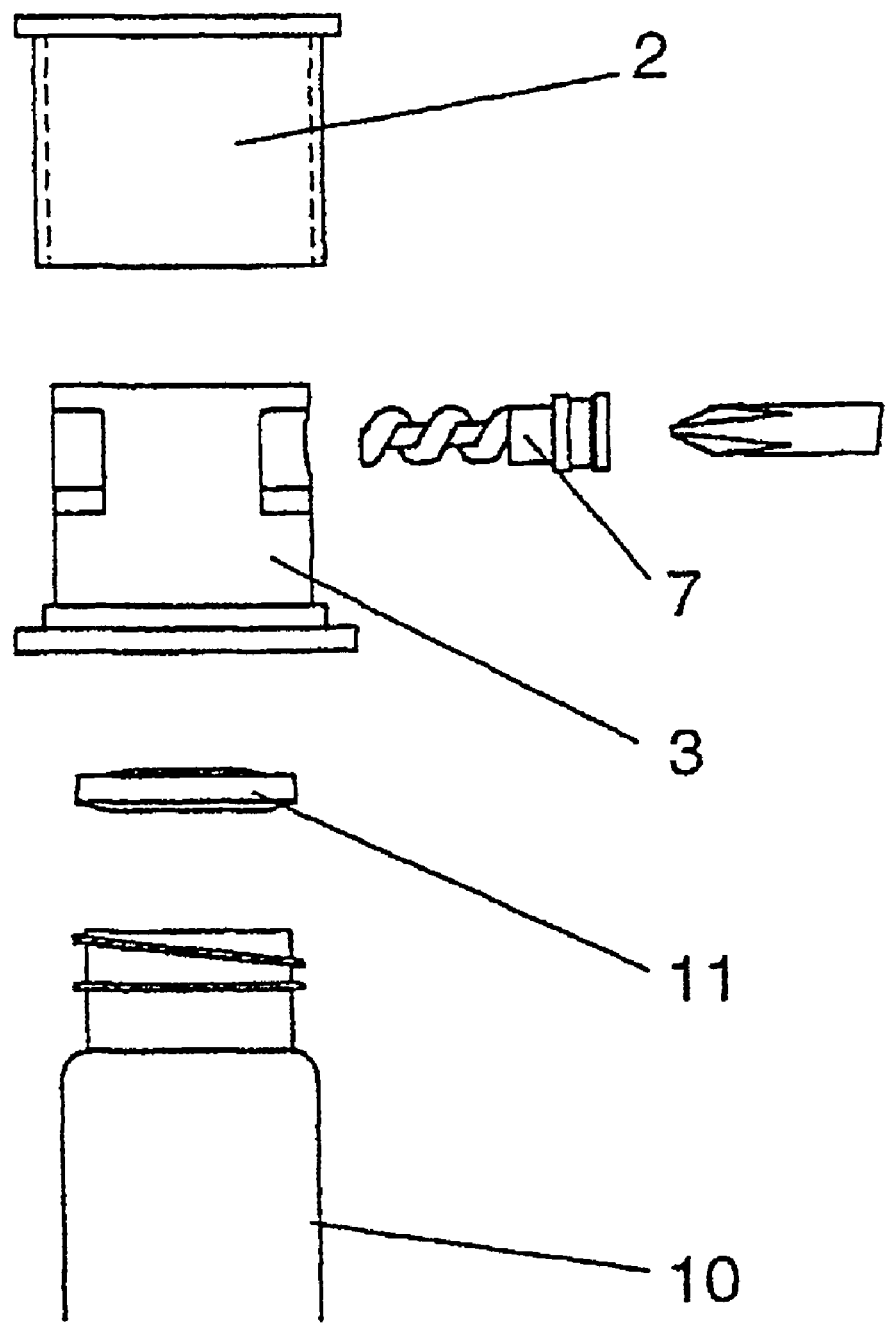
FIG. 3 is an exploded side view of the embodiment of the dosing device shown in FIG. 1.

FIG. 3 is an exploded view showing the hood (2), the body (3) of the dosing cap from FIG. 1, the endless screw (7), the washer (11) for leaktightness, and the container (10).

Figure 4:
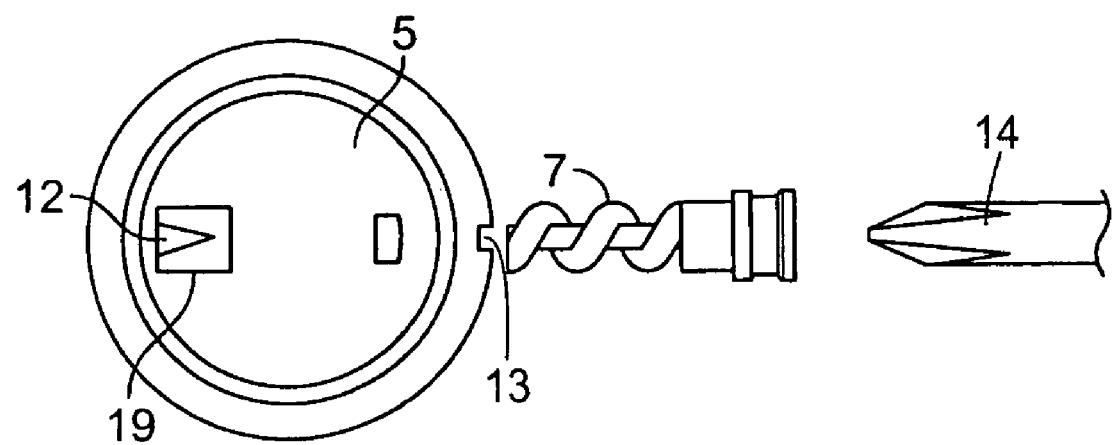
FIG. 4 is a view of the second end face of the cap of the dosing device in the particular embodiment of the dosing device in FIG. 1.

In FIG. 4, the second end face (5) of the dosing cap comprises the triangle-shaped dispensing opening (12) centered on the axis of the endless screw and having an angle opening in the direction of dispensing of the endless screw (7). In this embodiment, a first rectangular recess is formed within part of the thickness of the second end face. The triangle-shaped opening is formed within the remaining thickness, toward the inside of the cap. The indicator (13) is a notch formed on the outer surface of the body (3). The device for controlling and varying the angle of increment of rotation or the speed of rotation of the endless screw is a cross-shaped point (14) adapted to the cross-shaped transmission member of the endless screw.

Figure 5A:
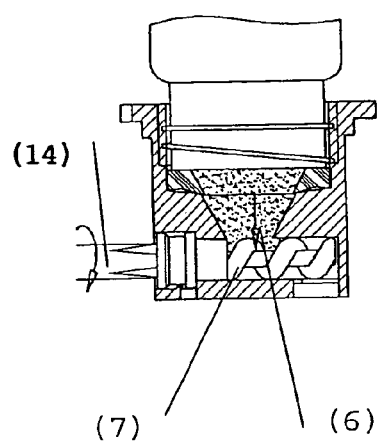
FIGS. 5a, 5b, 5c are side views, in cross section, of the powder dosing cap in operation.
Figure 5B:
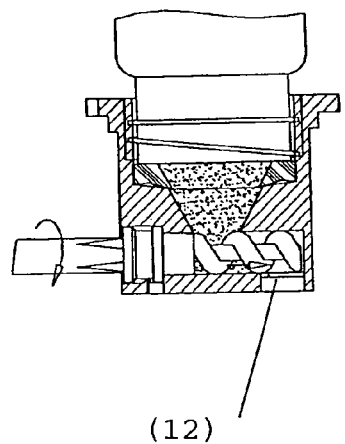
Figure 5C:
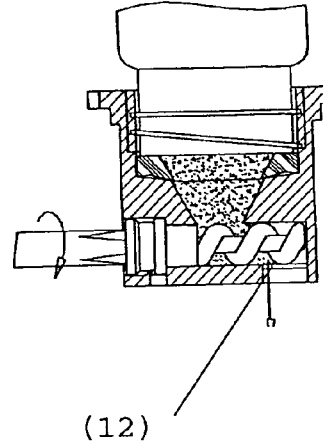

FIGS. 5a, 5b, 5c illustrate how a dosing cap operates. As has been explained above, the second end face and the opening of the cap are directed downward during operation. In FIG. 5a, the cross-shaped point (14) drives the endless screw (7) in a rotation movement about its axis which is supplied with powder through the feed aperture (6). In FIG. 5b, the powder is entrained by the endless screw, in the direction of dispensing, toward the triangle-shaped opening (12). In FIG. 5c, the powder is dispensed through the dispensing opening (12).

Figure 6:
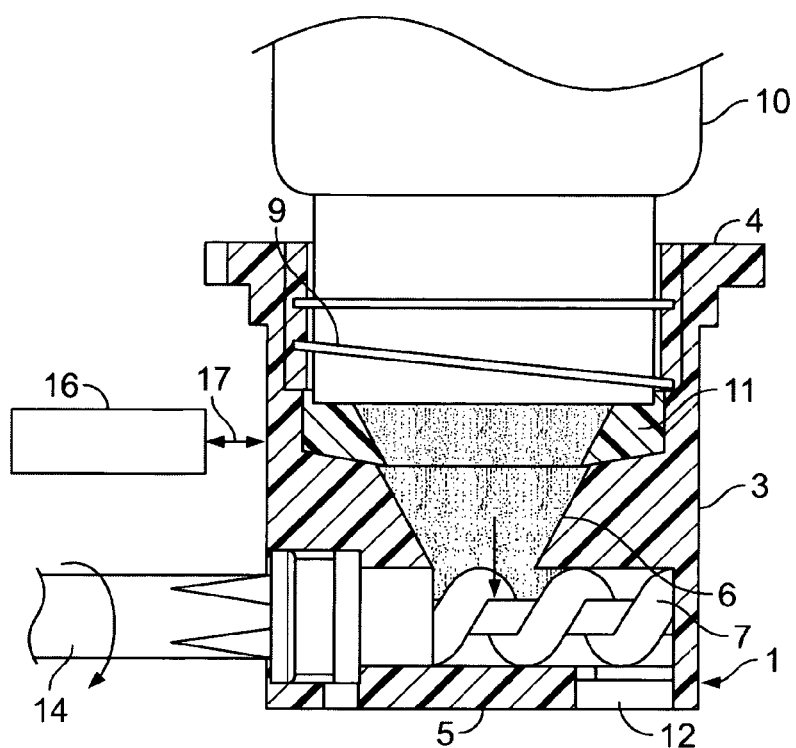
FIG. 6 is a schematic side view in cross-section of an additional embodiment.

In FIG. 6, an alternate embodiment of the dosing cap 1 is shown schematically. A tapping device 16 is associated with the body 3 of the dosing cap 1. The tapping device 16 is a finger that moves inward and outward relative to the body 3 as shown by arrow 17.

Figure 7:
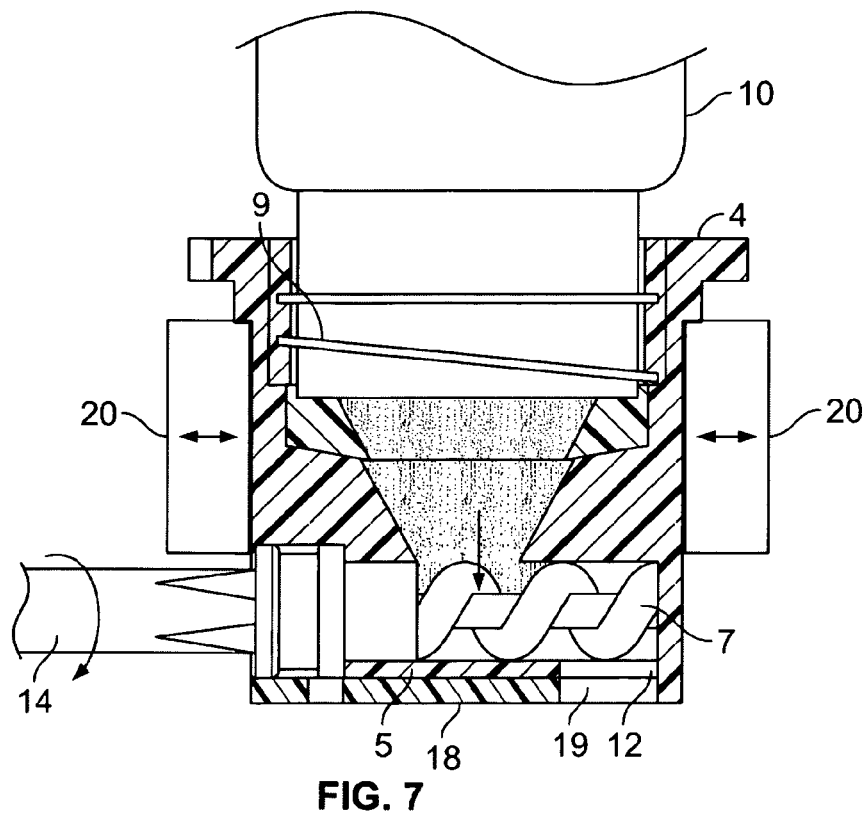
FIG. 7 is a schematic side view in cross-section of a still further embodiment.

In FIG. 7 a further embodiment of the dosing cap is shown schematically. A cover element 18 is shown covering the second end face 5. The cover element 18 includes an opening 19 that can be rotated or pivoted to cover and uncover opening 12 in the second end face 5. FIGS. 9a, 9b, 9c show the cover element 18 in three different positions that uncover opening 12, close the opening 12, and partly cover opening 12, respectively. A vibrating holding fork 20 is attached to the body 3. The vibrating holding fork 20 vibrates the body to promote the dispensing of the powder.

Figure 8:
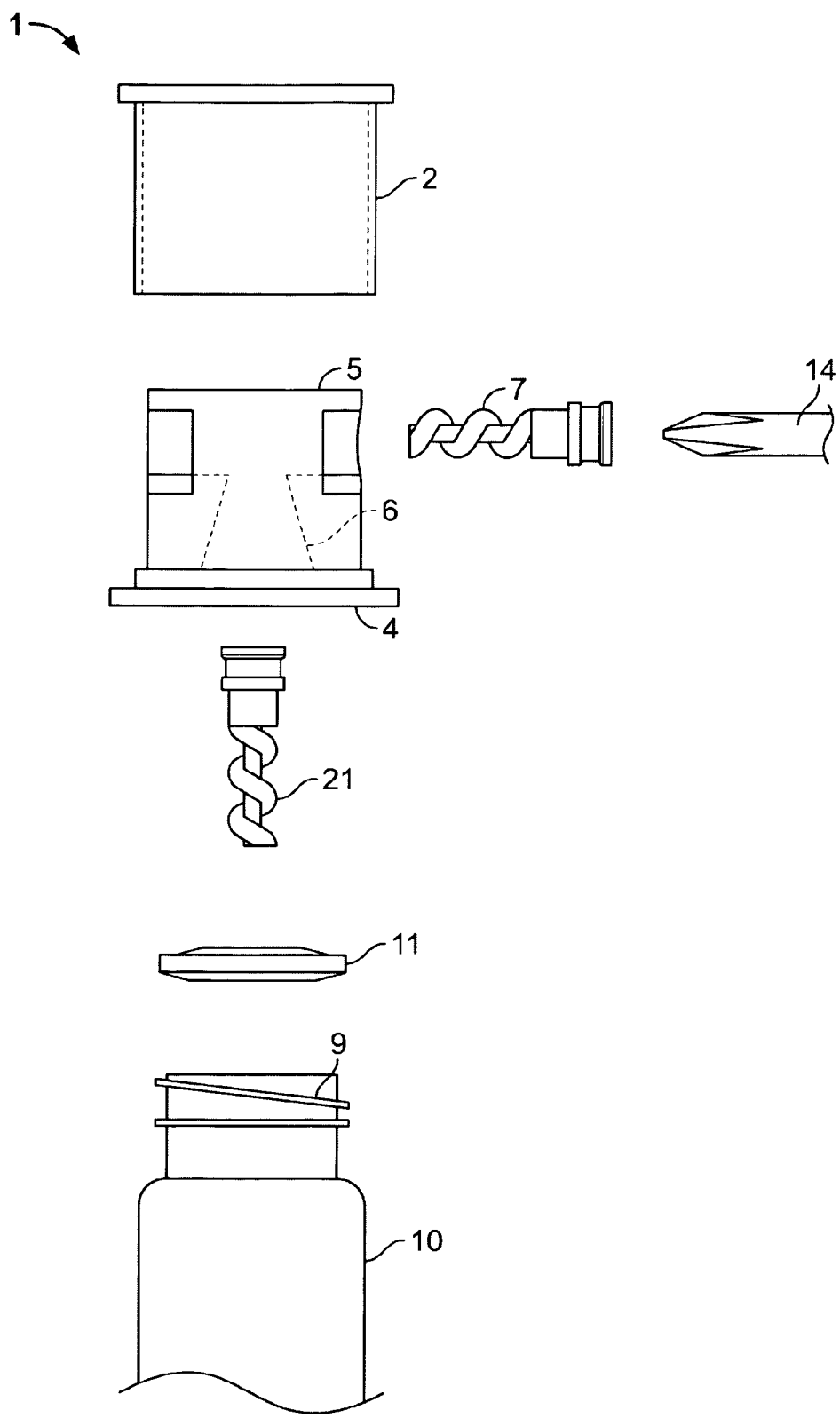
FIG. 8 is an exploded side view of a still further embodiment.

In FIG. 8, an agitator 21 is placed within the feed hopper 6 on an axis at an angle of about 90° from the second end face 5. The agitator 21 is in the form of an endless screw similar to endless screw 7. The agitator 21 assists in feeding the powder into the feed hopper 6 to endless screw 7. FIG. 11 shows an alternate agitator device. A drill bit 22 can be placed in the same position as the endless screw 21.

In FIG. 10, a further embodiment is schematically shown with an ionizing device 25 associated with the body 3. The ionizing device is connected to two electrodes 26a, 26b associated with the opening 12 to generate a field to charge the particles as the particles are dispensed.

EXAMPLE

A dosing cap according to the invention, adapted to standard flasks having a neck of the BV18 Pharma type, comprising a molded body made of polypropylene and an endless screw made of polyethylene having a diameter and a screw thread both of about 5 mm is used to independently dose 2 mg of lactose and 2 mg of cornstarch.

Although the means of measuring the results have not been completely optimized, the following nonlimiting results were obtained:
- the lactose was dosed at 2 mg with a precision of ±0.07 mg for 85% of the measurements, and with a precision of ±0.1 mg for 100% of the measurements;
- the cornstarch was dosed at 0.2 mg with a precision of ±0.15 mg for more than 90% of the measurements.

Moreover, the time saved compared to when using devices of the prior art was evaluated at 30%.

The invention claimed is:

1. A powder dosing cap, comprising a body having a first end face designed to be brought into communication with a powder container, a second end face opposite the first end face at least one feed hopper within the body, the feed hopper in communication with at least one endless screw, wherein the feed hopper widens toward the first end face and at least one dispensing opening for the powder to be dispensed, wherein the dispensing opening is positioned on the second end face and is always in communication with the endless screw, and wherein the dispensing opening has the shape of a triangle centered on the axis of the endless screw and having an angle opening in the direction of dispensing of the endless screw.

2. The powder dosing cap as claimed in claim 1, wherein the dispensing opening is formed within a thickness less than the full thickness of the second end surface, toward the inside of the cap.

3. The powder dosing cap as claimed in claim 1, comprising a means of closing all or part of the dispensing opening in order to permit modification of the surface area of said opening.

4. The powder dosing cap, comprising a body having a first end face designed to be brought into communication with a powder container, a second end face opposite the first end face at least one feed hopper within the body, the feed hopper in communication with at least one endless screw, wherein the feed hopper widens toward the first end face and at least one dispensing opening for the powder to be dispensed, wherein the dispensing opening is positioned on the second end face and is always in communication with the endless screw, wherein the closure means comprises at least one element covering all or part of the second end face, said element being movable relative to the second end face and having a through-hole which can be positioned opposite the dispensing opening, and a means of closing all or part of the dispensing opening in order to permit modification of the surface area of said opening.

5. The powder dosing cap as claimed in claim 1, wherein the endless screw can function by being rotated in one direction or in the opposite direction.

6. The powder dosing cap as claimed in claim 1, wherein the endless screw comprises a transmission member designed to permit rotation of the endless screw.

7. The powder dosing cap as claimed in claim 1, wherein the endless screw is coupled to a device by means of which it is possible to vary and control the angle of increment of rotation or the speed of rotation of the endless screw by acting on the transmission member giving a rotary movement of the screw and/or is coupled to a device promoting the dispensing of the powder.

8. The powder dosing cap as claimed in claim 1, further comprising a device promoting the dispensing of the powder by vibration and/or by tapping of the dosing cap and/or of the powder container.

9. The powder dosing cap as claimed in claim 8, wherein the device promoting the dispensing of the powder by tapping is a retractable finger.

10. The powder dosing cap as claimed in claim 8, wherein the device promoting the dispensing of the powder by vibration is a holding fork.

11. The powder dosing cap as claimed in claim 1, additionally comprising an agitator placed inside the feed hopper.

12. The powder dosing cap as claimed in claim 11, wherein the agitator is an element rotating about an axis substantially perpendicular to the first and/or second end face.

13. The powder dosing cap as claimed in claim 11, wherein the agitator is an endless screw.

14. The powder dosing cap as claimed in claim 1, further comprising at least one antistatic device.

15. The powder dosing cap as claimed in claim 1, wherein the parts of which it is made up are of a material which is thermally stable under the conditions of use and of storage and chemically inert to the powders to be dosed, such as polyethylene, polypropylene, and fluoropolymers, such as polytetrafluoroethylene.

16. A powder dosing device comprising a powder container brought into communication with a dosing cap as claimed in claim 1.

17. A process for dosing powders comprising a step of using the powder dosing device as claimed in claim 1.

18. The powder dosing cap as claimed in claim 11, wherein the agitator is a drill.

19. The powder dosing cap as claimed in claim 4, wherein the dispensing opening has a shape selected from the group consisting of a triangle, quadrilateral, circle or ellipse.

20. The powder dosing cap as claimed in claim 4, wherein the endless screw can function by being rotated in one direction or in the opposite direction.

* * * * *